United States Patent

Hayakawa et al.

[11] Patent Number: 5,702,731
[45] Date of Patent: Dec. 30, 1997

[54] LATERAL TYPE MOLDING APPARATUS FOR THE PRODUCTION OF COMPOSITE INSULATORS

[75] Inventors: Koji Hayakawa, Handa; Isao Nakajima; Yusuke Utsumi, both of Nagoya, all of Japan

[73] Assignee: NGK Insulators, Ltd., Japan

[21] Appl. No.: 472,710

[22] Filed: Jun. 6, 1995

[30] Foreign Application Priority Data

Dec. 28, 1994 [JP] Japan ................ 6-327682

[51] Int. Cl.⁶ .......... B29C 45/14; B29C 45/18; B29C 45/34
[52] U.S. Cl. .......... 425/125; 249/107; 249/141; 249/160; 264/271.1; 264/275; 425/451.9; 425/543; 425/573; 425/812; 425/129.1
[58] Field of Search ............ 249/160, 79, 107, 249/141; 425/121, 129.1, 234, 543, 573, 451.9, 812, 125; 264/271.1, 275; 174/178, 179, 181

[56] References Cited

U.S. PATENT DOCUMENTS

| | | | |
|---|---|---|---|
| 1,502,393 | 7/1924 | Morris | 249/107 |
| 2,672,653 | 3/1954 | Simpkins et al. | 249/141 |
| 2,924,851 | 2/1960 | Birckhead, Jr. et al. | 249/141 |
| 3,257,501 | 6/1966 | Sauer | 425/543 |
| 4,373,113 | 2/1983 | Winkler et la. | 174/179 |
| 4,702,873 | 10/1987 | Kaczerginski | 264/278 |
| 5,262,115 | 11/1993 | Tomlinson | 264/278 |
| 5,409,654 | 4/1995 | Platusich | 264/275 |
| 5,484,564 | 1/1996 | Goto | 264/275 |

FOREIGN PATENT DOCUMENTS

| | | | |
|---|---|---|---|
| 704825 | 4/1941 | Germany | 249/107 |
| 36858 | 6/1965 | Germany | 425/129.1 |
| 35 21 653 A1 | 4/1987 | Germany | 174/179 |
| 845022 | 8/1960 | United Kingdom | 425/129.1 |

*Primary Examiner*—Robert Davis
*Attorney, Agent, or Firm*—Parkhurst, Wendel & Burr, L.L.P.

[57] ABSTRACT

A composite insulator-producing lateral type molding apparatus includes a mold body constituted by a first molding unit and a second molding unit, each of said first and second molding units being provided, at an inner peripheral face, with recesses for the formation of a housing constituted by a plurality of shed portions and a axial portion connecting these shed portions, means for opening or tightening the first molding unit and the second molding unit, a pouring passage for pouring a housing-forming material into said recesses, and housing-forming material escape holes. A core member of the insulator is placed between the first and second molding units, the first and second molds are tightened, and the housing-forming material is poured into said recesses to form the housing. The first molding unit and the second molding unit extend laterally, and that the core member is laterally arranged horizontally between first and second molding units.

6 Claims, 7 Drawing Sheets

FIG_1
PRIOR ART

FIG_2

FIG_3

FIG_6

FIG_7

FIG_10

FIG_11

FIG._12

LATERAL TYPE MOLDING APPARATUS FOR THE PRODUCTION OF COMPOSITE INSULATORS

BACKGROUND OF THE INVENTION (1) Field of the Invention

The present invention relates to a lateral type molding apparatus for the production of composite insulators.

The term "insulator" used in this application includes a so-called hollow insulator, and the lateral type molding apparatus of the present invention is particularly suitable for the production of the composite insulators. The "hollow insulator" is an insulating member to be used in a bushing body, and has a through-hole through which a conducting member is passed in an axial direction. The "bushing" means a device for supporting a conducting member through a wall or a partition wall in an insulated manner when the conducting member is passed through the wall or the partition wall of a tank or the like.

The "composite insulator" means an insulator which includes a core member made of FRP or the like, and a housing made of an elastic polymer material and provided around the outer peripheral face of the core member. The core member includes a solid rod and a tube. As an elastic polymer material, silicone rubber, ethylene-propylene terpolymer, ethylene-propylene-diene terpolymer, etc. may be recited. Therefore, a "housing-forming material" used in this application is an elastic polymer material in a non-cured state.

(2) Related art statement

Figure 1:
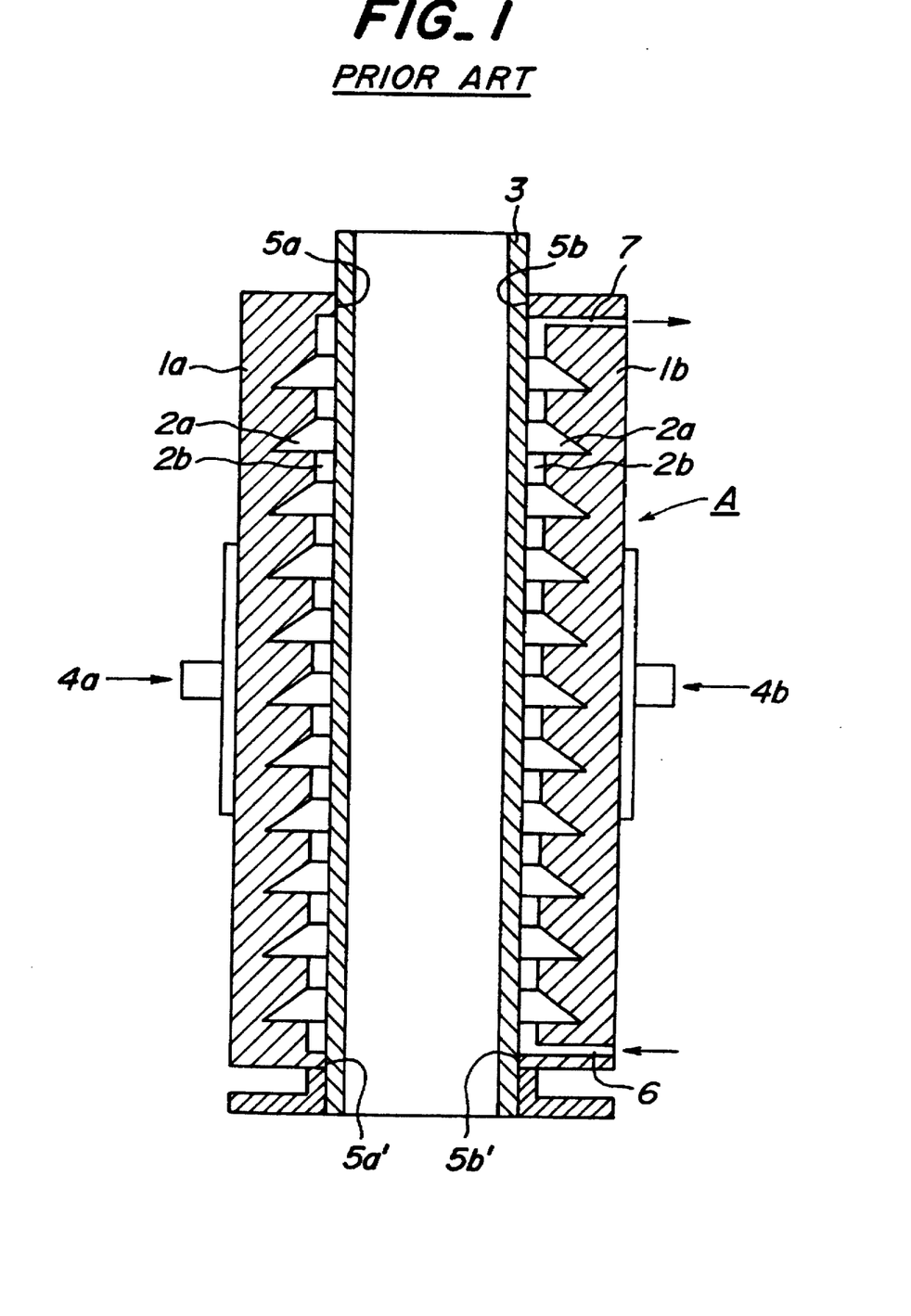
FIG. 1 is a diagrammatical sectional view for schematically illustrating the conventional vertical type molding apparatus for the production of the integrated type composite insulator.

Heretofore, insulators made of porcelain have been used. Recently, as mentioned above, the composite insulator including the core member made of FRP or the like and the insulator housing made of the elastic polymer material around the outer peripheral face of the core member have been proposed and used. A vertical type molding apparatus A shown in FIG. 1 is used as the molding apparatus for producing the above composite insulator. In FIG. 1, the molding apparatus A includes a pair of molding units 1a and 1b. At an inner peripheral face of each molding unit are provided recesses 2a, 2b for the formation of the housing composed of shed portions and a trunk portion around the core member of the insulator. In FIG. 1, the insulator core member 3 is arranged between the molding units 1a and 1b, and inner peripheral surfaces 5a, 5a', 5b, 5b' of upper and lower end portions of the molding units 1a and 1b are pressed against and closely fitted to the outer peripheral surface of the core member of the insulator by means of pressing means 4a, 4b. At a lower end portion of the molding unit 1 is provided a pouring passage 6 communicating with the lowermost end recess for pouring a synthetic resin such as silicone rubber as a housing-forming material. A rubber-escape passage 7 is provided at the upper end portion of the molding unit 1. This rubber-escape passage 7 communicates with the upper end portion of the recess, and is adapted to overflow rubber and function as an air escape hole. The open area of the rubber-escape passage 7 is so set that the housing-forming material may be completely charged into outer edge portions of the recesses forming the shed portions. If the open area of the rubber-escape passage is too large, there is a possibility that the rubber overflows through the rubber-escape passage 7 at a certain location to make it difficult to completely fill the rubber into outer peripheral portion of a shed portion at other location. On the hand, if the open area is too small, the internal pressure of the mold becomes so excessive that the housing-forming material may leak through parting faces, etc. In order to attain an appropriate pouring resistance, for example, a given pouring pressure may be applied inside the molding units by making the entire sectional area of the rubber-escape passage 7 smaller than that of the pouring passage. In this case, for example, the entire sectional area of the pouring passage is set at 113 mm$^2$ (diameter: 12 mm$^2$) in forming twelve shed portions around the core member, the open area of the rubber escape passage is set at 0.5×0.5 mm (0.5×0.5×12<113 mm$^2$).

However, when a long insulator is to be produced by using the above insulator-producing vertical type molding apparatus, the height of the molding apparatus increases, thereby making it necessary to increase the height of a building for accommodating the molding apparatus. Therefore, in this case, it is not easy to arrange such a long insulator core member between the molding units, and a construction cost for such molding apparatus and that for the building to accommodate the molding apparatus increase.

SUMMARY OF THE INVENTION

An object of the present invention is to provide a lateral type molding apparatus for the production of the insulators, which molding apparatus enables even a long insulator to be easily arranged between a pair of molding units, and also can reduce the construction cost of the molding apparatus and that for a building for accommodating the molding apparatus.

The composite insulator-producing lateral type molding apparatus according to the present invention includes a mold body constituted by a first molding unit and a second molding unit, said first and second molding units being provided, at their inner peripheral faces, with respective recesses for the formation of a housing constituted by a plurality of shed portions and a trunk portion connecting these shed portions, means for opening or tightening the first molding unit and the second molding unit, a filling passage for introducing a housing-forming material into said recesses, and housing-forming material escape passages, wherein a core member of said insulator is placed between the first and second molding units, the first and second molds are tightened, the housing-forming material is introduced into said recesses to form the housing, characterized in that the first molding unit and the second molding unit extend laterally, and that said core member is laterally arranged between first and second molding units.

Preferred embodiments of the insulator-producing apparatus of the present invention are recited as follows. So long as no discrepancy exists, these preferred embodiments may be arbitrarily combined together also as preferred embodiments.

(1) Each of the first mold unit and the second mold unit is constituted by piling and tightening a plurality of mold segments together, and a recess for the formation of a shed portion of the housing is formed between each set of adjacent mold segments.

(2) Parting faces formed between the first molding unit and the second molding unit when the first molding unit and the second molding unit are closed extend in an almost vertical direction.

(3) A runner is provided laterally in the molding body under the shed portion-forming section, the runner and a lower end of each of shed portion-forming recesses are connected by a gate, and the housing-forming material pouring passage is communicated with the runner.

(4) The runner, the gates, the housing-forming material pouring passage and the housing-forming material escape passage are formed at a parting face of at least one of the first molding unit and the second molding unit.

(5) An upper end of each of the housing-forming material escape passages extends up to an upper face of the mold body, a recess is provided at the upper face of the mold body near the upper end of the housing-forming material escape passage, and the upper end of the housing-forming material escape passage is opened to said recess.

(6) A single recess is provided longitudinally at the upper face of the mold body, and the upper ends of the housing-forming material escape passages are opened to the recess extending longitudinally at the upper face.

According to the composite insulator-producing lateral type molding apparatus, since the first molding unit and the second molding unit are laterally extended, a core member for even a long composite insulator can be easily arranged between a pair of the molding units. Further, the construction cost for the molding apparatus and that for a building for accommodating the molding apparatus can be lowered. Furthermore, the above-mentioned preferred embodiments (1) through (6) of the composite insulator-producing lateral type molding apparatus according to the present invention exhibit the following functions and effects.

(1) When each of the first molding unit and the second molding unit is constituted by piling a plurality and tightening the molding segments together and a recess for the formation of a shed portion of the housing is formed between two adjacent segments, any necessary molding unit can be formed by piling and tightening together a given number of the mold segments to meet the length of the insulator desired to be produced. Therefore, only when a plurality of molding segments are preliminarily prepared, composite insulators having arbitrary lengths can be produced without necessity to prepare a plurality of molds corresponding to the composite insulators having different lengths.

(2) In case that the parting faces formed between the first molding unit and the second molding unit when the first molding unit and the second molding unit are closed extend in an almost vertical direction, the housing-forming material feed passage and the air/rubber escape passage can be provided vertically and easily along the parting faces.

(3) When the runner is provided laterally in the molding body under the shed portion-forming section, the runner and a lower end of each of shed portion-forming recesses are connected by a gate, and the housing-forming material pouring passage is communicated with the runner, the housing-forming material can be uniformly distributed into the shed portion-forming recesses through the runner and the gates so that the housing may be more effectively formed around the core member of the composite insulator.

(4) When the runner, the gates, the housing-forming material filling passage and the housing-forming material escape passage are formed at the parting face of at least one of the first molding unit and the second molding unit, the runner, the gates, the housing-forming material filling passage and the housing-forming material escape passage can be easily formed.

(5) When the upper end of each of the housing-forming material escape passages extends up to an upper face of the mold body, a recess is provided at the upper face of the mold body near the upper end of the housing-forming material escape passage, and the upper end of the housing-forming material escape passage is opened to said recess, the housing-forming material coming out through the upper end of the escape passage can be collected in the recess and the housing-forming material solidified can be easily removed after the formation of the housing of the composite insulator.

(6) When a single recess is provided longitudinally at the upper face of the mold body, and the upper ends of the housing-forming material escape passages are opened to the recess extending longitudinally at the upper face, the housing-forming material coming out and solidified can be more easily removed.

These and other objects, features and advantages of the present invention will be well appreciated upon reading the following description of the invention when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

In the following, the present invention will be explained in more detail with reference to specific embodiments shown in the attached drawings.

Figure 2:
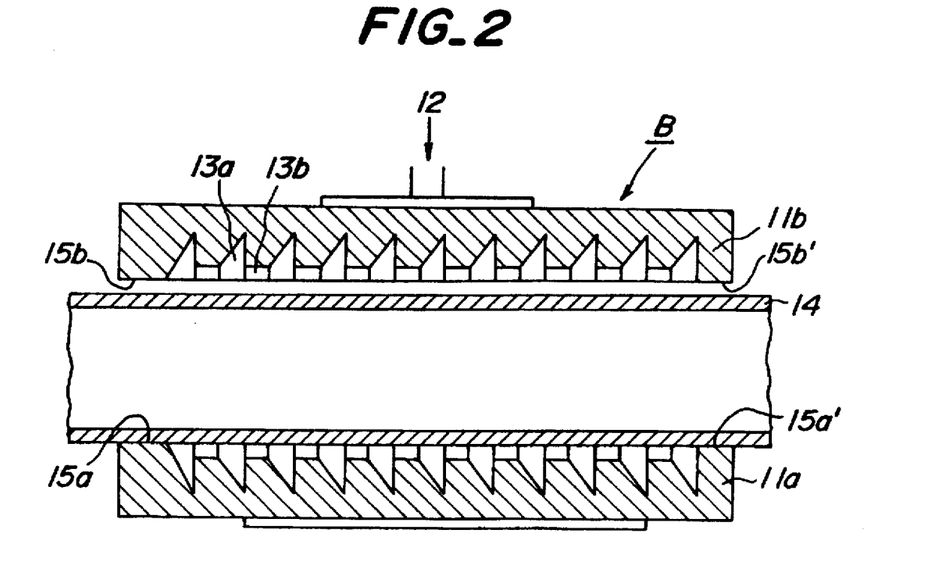
FIG. 2 is a diagrammatical sectional view for schematically illustrating one embodiment of the lateral type molding apparatus according to the present invention for the production of the integrated type composite insulator.

In FIG. 2 is shown in a cross section a composite insulator-producing lateral molding apparatus B constituted by a pair of integral molding units. A first molding unit 11a is placed laterally, that is, in an almost horizontal direction, on a fixing table not shown. A second molding unit 11b is arranged laterally above the first molding unit 11a. The second molding unit 11b is vertically movable by a pressing means 12, which effects closing and opening of the first and second molding units. At an inner side of each of the molding unit are formed semi-cylindrical recesses 13a and 13b for shaping shed portions and sheath portions around a core member 14 of a composite insulator, respectively. In the embodiment of FIG. 2, the molding units 11a, 11b are opened, the insulator core member 14 is placed on the molding unit 11a, and the upper molding unit 11b is moved downwardly by the pressing means 12. Thereby, inner peripheral surfaces 15a, 15a', 15b, 15b' of the first and second molding units at right and left end portions are closely engaged and press contacted with the outer peripheral surface of the insulator core member 14. The right and left end portions of each of the molding units extend axially inwardly beyond the inner peripheral surfaces of the trunk portion-forming recesses in the intermediate location, so that the above close engagement and press contacting may be effected. The first molding unit 11a is provided with a filling passage (not shown) connected to lower portions of the recesses for feeding therein a synthetic resin such as silicone rubber as a housing-forming material. In an upper end portion of the second molding unit are provided housing-forming material escape passages (not shown in FIG. 2), which communicate with uppermost ends of the recesses to overflow the housing-forming material and escape air therethrough.

Figure 3:
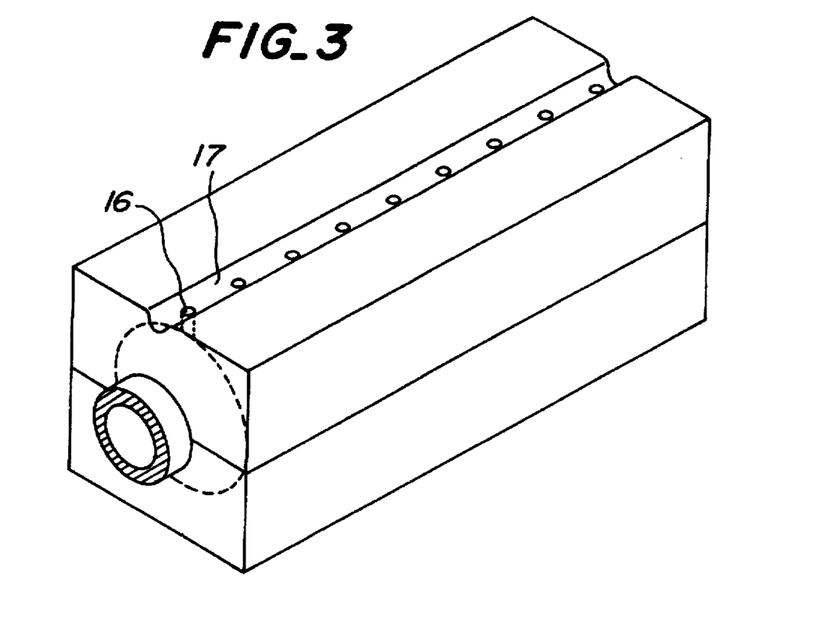
FIG. 3 is a diagrammatical sectional view for schematically illustrating another embodiment of the lateral type molding apparatus according to the present invention for the production of the integrated type composite insulator, in which a single channel-like groove is provided at an upper face of a mold body, and housing-forming material escape passages are opened to this recess.

In FIG. 3 is an example of such housing-forming material escape passages. The housing-forming material escape passages 16 communicate with the highest location of the inner periphery of each of the shed portion-forming recesses, and extend upwardly to open to the upper face of the second molding unit 11b. In FIG. 3, a single channel-like recess 17 is formed at the upper face of the molding unit 11b, the housing-forming material escape passages 16 are opened to the inner face of the recess 17. By so doing, the housing-forming material, which comes out through the housing-forming material escape holes 16 and is solidified, can be easily removed.

The housing-forming material introduced into the recesses 13a, 13b of the mold is cured by heating with an appropriate heater provided inside or outside the mold. After the housing-forming material is cured and the molds are opened, the composite insulator produced inside the mold is taken out from the mold.

Figure 4:
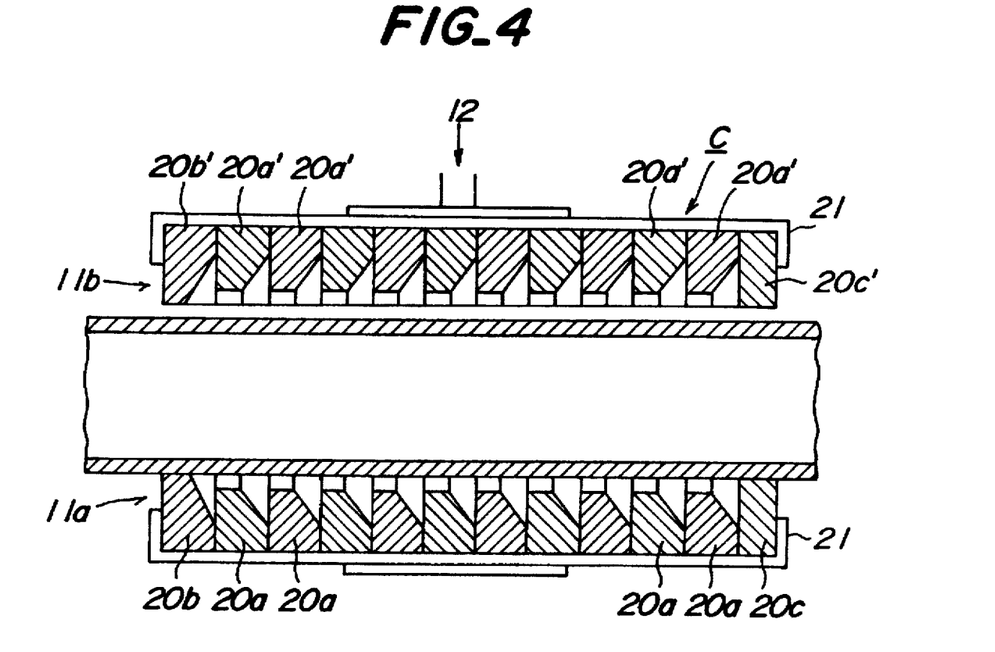
FIG. 4 is a diagrammatical sectional view for schematically illustrating one embodiment of the lateral segment type molding apparatus according to the present invention for the production of the integrated type composite insulator.
Figure 5:
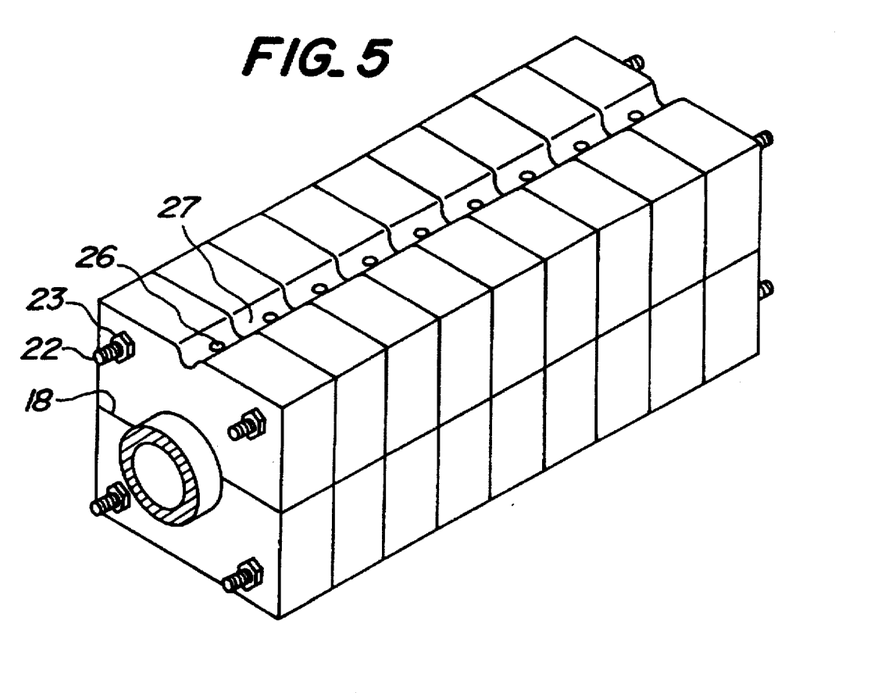
FIG. 5 is a diagrammatical sectional view for schematically illustrating another embodiment of the lateral segment type molding apparatus according to the present invention for the production of the integrated type composite insulator, in which a single channel-like groove is provided at an upper face of a mold body, and housing-forming material escape passages are opened to this recess.

FIG. 4 shows a composite insulator-producing lateral type molding apparatus having substantially the same construction as that in FIG. 2 except that each of a first molding unit and a second molding unit is constructed by piling and tightening a plurality of mold segments 20 together, and a recess for forming a shed portion of a housing is provided between each set of two adjacent segments. In this embodiment, each of the molding units 11a, 11b is formed by preparing a given number of the mold segments to meet the length of a composite insulator to be produced, and axially tightening the mold segments. In FIG. 4, the mold segments are tightened together in the axial direction by means of an outer frame 21 of which axial length is variable. For example, however, as shown in FIG. 5, the mold segments are tightened together by passing tightening bolts 22 through holes bored axially at outer corners of each of mold segments and tightly screwing nuts 23 to the bolts 22. The mold segments of each of the molding units includes intermediate potions 20a, 20a', a left portion 20b, 20b' and a right portion 20c, 20c'. The intermediate portion 20a, 20a' has an almost trapezoidal section shown in FIG. 4, having almost the same shape. A shed portion is shaped between a conical face having a sectionally inclined shape in a given intermediate portion 20a and a vertical face of an adjacent intermediate portion 20a. A trunk portion of the housing is shaped between an axially extending inner peripheral face of the intermediate portion 20a and an outer peripheral face of the insulator core member. An axially extending cylindrical inner peripheral face of each of the left portion 20b, 20b' and the right portion 20c, 20c' extends radially inwardly beyond the axially extending cylindrical inner peripheral face of the intermediate portion 20a, 20a', and when the molding units are closed, the axially extending cylindrical inner peripheral faces of the left portions 20b, 20b' and the light portions 20c, 20c' are closely fitted against and press contacted with the core member.

FIG. 5 shows an example of housing-forming escape passages for the lateral segment type composite insulator-molding apparatus shown in FIG. 4. The housing-forming material escape passage 26 communicates with the height location of the inner peripheral surface of each shed portion-forming recess, and extends upwardly to be opened to the upper face of the molding unit 11b. In FIG. 5, a single channel-like recess 27 is provided at the upper face of the molding unit 11b, and the housing-forming material escape passage 26 is opened to the inner face of the recess 27. By so doing, the housing-forming material coming out of the housing-forming material escape passage 26 and solidified can be easily removed.

Figure 6:
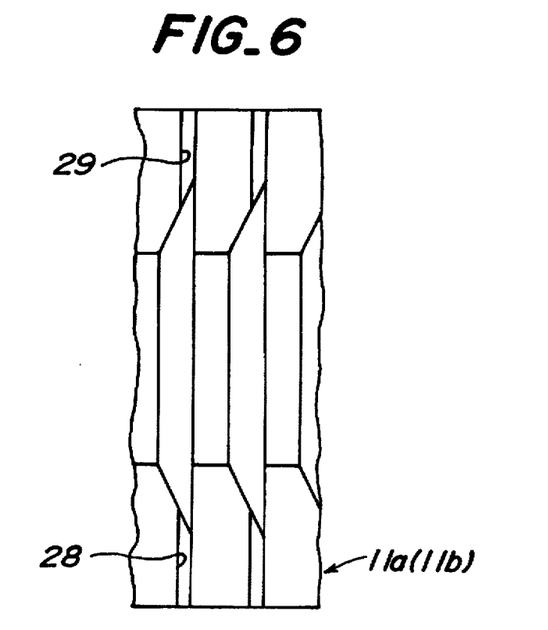
FIG. 6 is a diagrammatical sectional view for schematically illustrating one molding unit of another embodiment of the lateral type molding apparatus according to the present invention for the production of the integrated type composite insulator, in which a parting face is arranged in an almost vertical direction, and housing-forming material escape passages are opened to this single recess.
Figure 7:
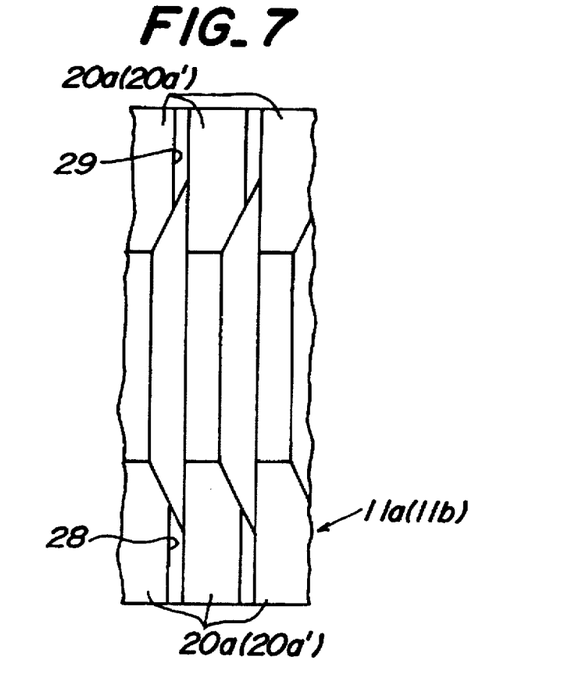
FIG. 7 is a diagrammatical sectional view for schematically illustrating one molding unit of another embodiment of the lateral segment type molding apparatus according to the present invention for the production of the integrated type composite insulator, in which a parting face is arranged in an almost vertical direction, and housing-forming material escape passages are opened to this single recess.

In the embodiment of FIGS. 2 and 3 and those of FIGS. 4 and 5, the parting faces 18 formed at the fitting interface between a pair of the molding units are arranged in the horizontal direction. Such parting faces can be arranged in a vertical direction (See FIGS. 8 and 9). In this case, a pair of the molding units are placed on left and right sides, and extends laterally. When the insulator core member is to be placed between the molding units, the insulator core member can be located in a central portion between a pair of the molding units by providing an appropriate insulator core member-holding means. When the parting faces are located in the vertical direction, the housing-forming material pouring passage 28 and the housing-forming material escape passages 29 can be provided by forming recesses on at least one of the parting faces of the molding units. See FIGS. 6 and 7.

Figure 8:
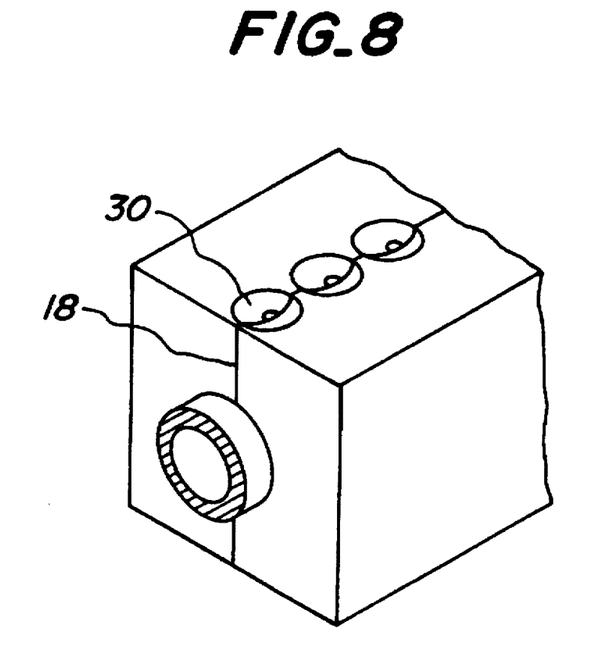
FIG. 8 is a diagrammatical sectional view for schematically illustrating a still further embodiment of the lateral type molding apparatus according to the present invention for the production of the integrated type composite insulator, in which a parting faces are arranged in an almost vertical direction, a plurality of recesses are provided at an upper face of a mold body in the parting faces correspondingly to shed portions, and housing-forming material escape passages are opened to the respective recesses.
Figure 9:
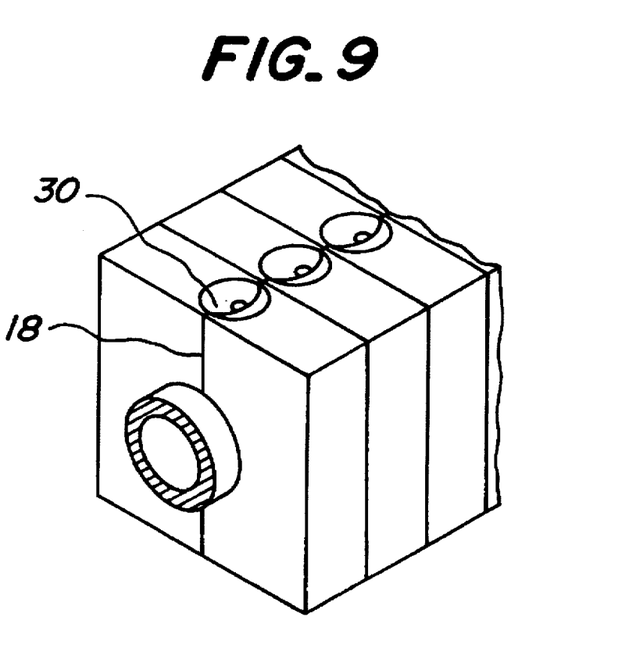
FIG. 9 is a diagrammatical sectional view for schematically illustrating a still further embodiment of the lateral segment type molding apparatus according to the present invention for the production of the integrated type composite insulator, in which parting faces are arranged in an almost vertical direction, a plurality of recesses are provided at an upper face of a mold body in the parting faces correpondingly to shed portions, and housing-forming material escape passages are opened to the respective recesses.

FIGS. 8 and 9 show an integrated lateral type composite insulator-molding apparatus and a lateral segment type composite insulator-molding apparatus, respectively. In these embodiments, the parting faces 18 are vertically arranged, a plurality of recesses 30 are formed at the upper face of the mold, and housing-forming material escape passages are opened to the respective recesses 30. By so doing, the housing-forming material overflowing a given housing-forming material escape passage will not enter or clog another housing-forming material escape passage.

Figure 10:
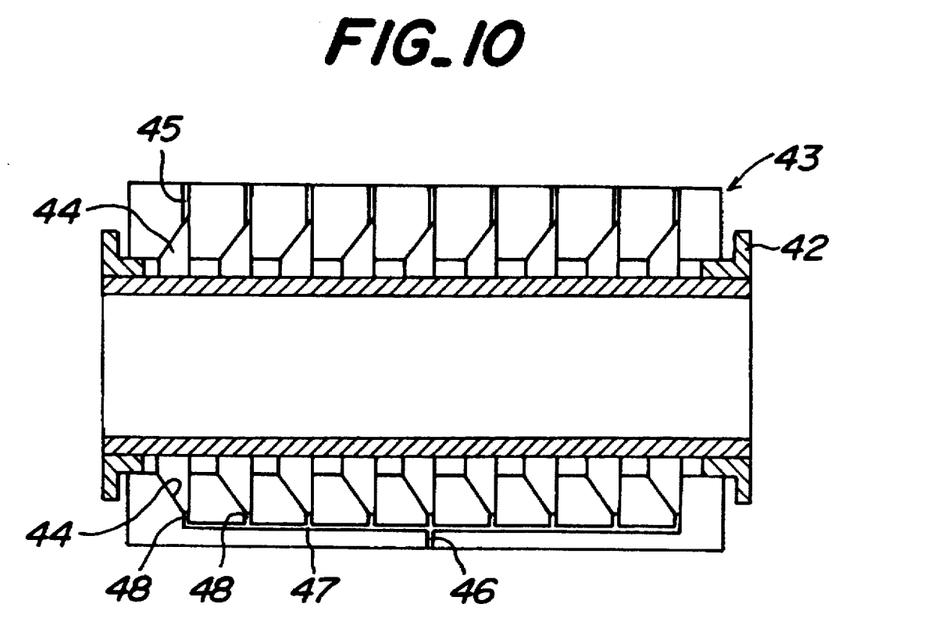
FIG. 10 is a a diagrammatical sectional view for schematically illustrating one molding unit of a still further embodiment of the lateral type molding apparatus according to the present invention for the production of the integrated type composite insulator, in which a parting face is arranged in an almost vertical direction, housing-forming material escape passages, a housing-forming material feed passage, a runner and gates are provided at the parting face.

FIG. 10 shows a still further embodiment of the integrated lateral type molding apparatus according to the present invention for the production of the composite insulator, in which parting faces are set almost vertically. FIG. 10 shows the state that an insulator core member is fitted to one of a pair of molding units. In the embodiment of FIG. 10, fitting members 42 are fitted to the outer periphery of the insulator core member at opposite ends so that the radially inner peripheral surface of the molding unit 43 at the opposite end portions may be held closely engaged with the radially outer peripheral surfaces of the fitting members 42. Recesses for housing-forming material escape passages 45 are provided at an upper half portion of the parting face of the molding unit 43 such that the housing-forming material escape passages 45 may extend substantially vertically from the highest locations of the outer peripheral portions of the recesses 44 for shaping shed portions. The grooves 45 are opened to the upper face of the molding unit 43. On the other hand, in a lower half portion of the parting face of the molding unit 43 are provided a substantially vertically extending recess 46 for a housing-forming material pouring passage, a recess 47, as a runner, extending horizontally and communicating with the recess 46 at a central portion, and recesses 48, as gates, extending from the runner recess 47 and communicating with the lowest locations of the outer peripheral portions of the respective recesses 44 for the formation of the shed portions. When a pair of the molding units are tightened, these recesses form the housing-forming material escape passages, the housing-forming material filling passage, the runner and the gates.

Figure 11:
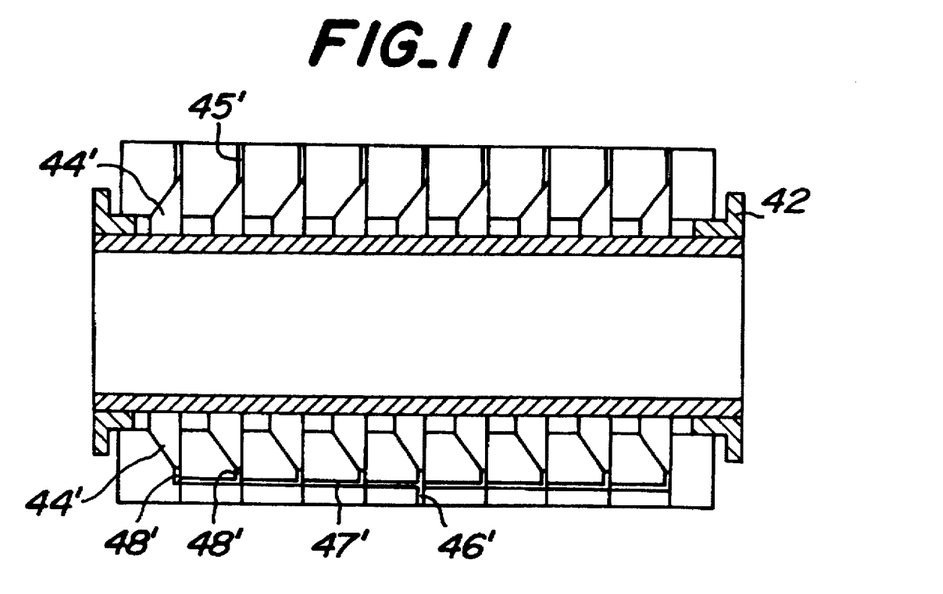
FIG. 11 is a a diagrammatical sectional view for schematically illustrating one molding unit of a still further embodiment of the lateral segment type molding apparatus according to the present invention for the production of the integrated type composite insulator, in which a parting face is arranged in an almost vertical direction, housing-forming material escape passages, a housing-forming material feed passage, a runner and gates are provided at the parting face.

FIG. 11 shows a still further embodiment of the lateral segment type molding apparatus according to the present invention for the production of the composite insulator. Each of a pair of the molding units is constituted by tightening a plurality of molding segments. In each of the segments, recesses are provided similarly to the embodiment of FIG. 10 to offer a recess 45' for a housing-material escape passage, a recess 46' for a housing-forming material filling passage, a recess 47' for a runner, and a recess 48' for a gate.

Figure 12:
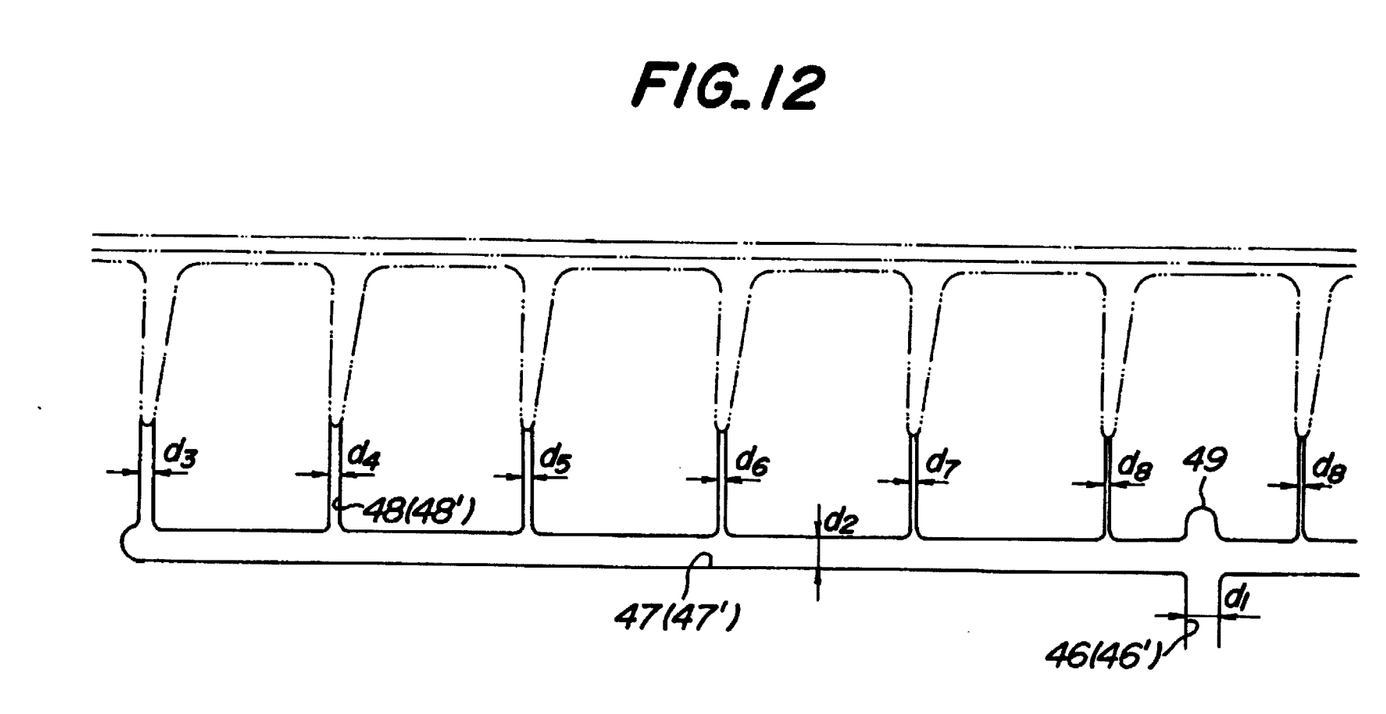
FIG. 12 is a diagrammatical view for schematically illustrating a housing-forming material feed passage, a runner and gates in a still further embodiment of the lateral type molding apparatus according to the present invention for the production of the integrated type composite insulator.

FIG. 12 shows an enlarged view for illustrating the recesses 46(46'), 47(47') and 48(48') for the formation of the housing-forming material filling passage, the runner and the gates, respectively. In FIG. 12, a reservoir section 49 for temporarily storing the housing-forming material is provided above the recess for the housing-forming material feed passage 46(46') via the runner. The diameter of the runner is set constant. In order to uniformly pouring the housing-forming material into the shed portion-shaping recesses, the diameters of the gates are successively reduced as they go to the central portion of the mold from the axially outer side. For example, as shown in FIG. 12, it may be set in terms of diameter that d1=12 mm, d2=12 mm, d3=10 mm, d4=8 mm, d5=6 mm, d6=4 mm, d7=2 mm, and d8=1 mm. The width of an opened portion of each gate toward the outer peripheral portion of the shed portion is constant at for example 3 mm.

In FIGS. 3, 5, 8 and 9, the recess or recesses are provided for making it easy to remove the housing-forming material coming out of the housing-forming material escape passages. If such a groove or grooves are not provided and the housing-forming material escape passages are too long or narrow, the pressure inside the mold may be excessive. In such a case, it may be that an enlarged portion is provided on a downstream side of the escape passage to open its downstream end portion, or a V-groove is provided to open the downstream side of the escape passage, thereby controlling the pressure inside the mold to an appropriate value.

What is claimed is:

1. A composite insulator-producing lateral molding apparatus, comprising:

a mold body having a first molding unit and a second molding unit, each of said first and second molding units being provided, at an inner peripheral face, with recesses for the formation of a housing having a plurality of shed portions and axial portions connecting the shed portions;

means for opening and tightening the first molding unit and the second molding unit;

a filling passage for introducing a housing-forming material into said recesses; and a plurality of housing-forming material escape passages, wherein a core member of said insulator is placed between the first and second molding units, the first and second molding units are tightened, and the housing-forming material is introduced into said recesses to form the housing, wherein the first molding unit and the second molding unit extend laterally, and said core member is laterally arranged between the first and second molding units, and wherein a single recess is provided longitudinally at an upper face of the mold body, and upper ends of the housing-forming material escape passages are open to said single recess.

2. The molding apparatus of claim 1, wherein each of the first molding unit and the second molding unit comprises a plurality of mold segments tightened together, and wherein a recess for the formation of a shed portion of the housing is formed between adjacent mold segments.

3. The molding apparatus of claim 1, wherein parting faces of the first and second molding units formed when the first molding unit and the second molding unit are tightened, extend in a substantially vertical direction.

4. The molding apparatus of claim 3, further comprising a runner provided laterally in the mold body under shed portion-forming recesses, wherein the runner and a lower end of each of the shed portion-forming recesses are connected by a gate, and the housing-forming material filling passage is connected to the runner.

5. The molding apparatus of claim 4, wherein the runner, the gates, the housing-forming material filling passage and the housing-forming material escape passages are formed at a parting face of at least one of the first molding unit and the second molding unit.

6. A composite insulator-producing lateral molding apparatus, comprising:

a mold body having a first molding unit and a second molding unit, each of said first and second molding units being provided, at an inner peripheral face, with recesses for the formation of a housing having a plurality of shed portions and axial portions connecting the shed portions;

means for opening and tightening the first molding unit and the second molding unit;

a filling passage for introducing a housing-forming material into said recesses; and     a plurality of housing-forming material escape passages, wherein a core member of said insulator is placed between the first and second molding units, the first and second molding units are tightened, and the housing-forming material is introduced into said recesses to form the housing, wherein the first molding unit and the second molding unit extend laterally, and said core member is laterally arranged between the first and second molding units, wherein an upper end of each of the housing-forming material escape passages extends up to an upper face of the mold body, a recess is provided at an upper face of the mold body near the upper end of each of the housing-forming material escape passages, and the upper end of each of the housing-forming material escape passages is open to said recess, and wherein a single recess is provided longitudinally at the upper face of the mold body, and the upper ends of the housing-forming material escape passages are open to said single recess.

* * * * *